No. 624,338. Patented May 2, 1899.
A. W. B. JOHNSON.
SELF WEIGHING SCALE.
(Application filed Jan. 10, 1898.)

(No Model.) 3 Sheets—Sheet 1.

WITNESSES:
H. Walker
Geo. J. Hosted

INVENTOR
A. W. B. Johnson
BY
ATTORNEYS.

No. 624,338. Patented May 2, 1899.
A. W. B. JOHNSON.
SELF WEIGHING SCALE.
(Application filed Jan. 10, 1898.)

(No Model.) 3 Sheets—Sheet 2.

WITNESSES:
H. Walker
Geo. G. Hosket

INVENTOR
A. W. B. Johnson
BY
Munn
ATTORNEYS.

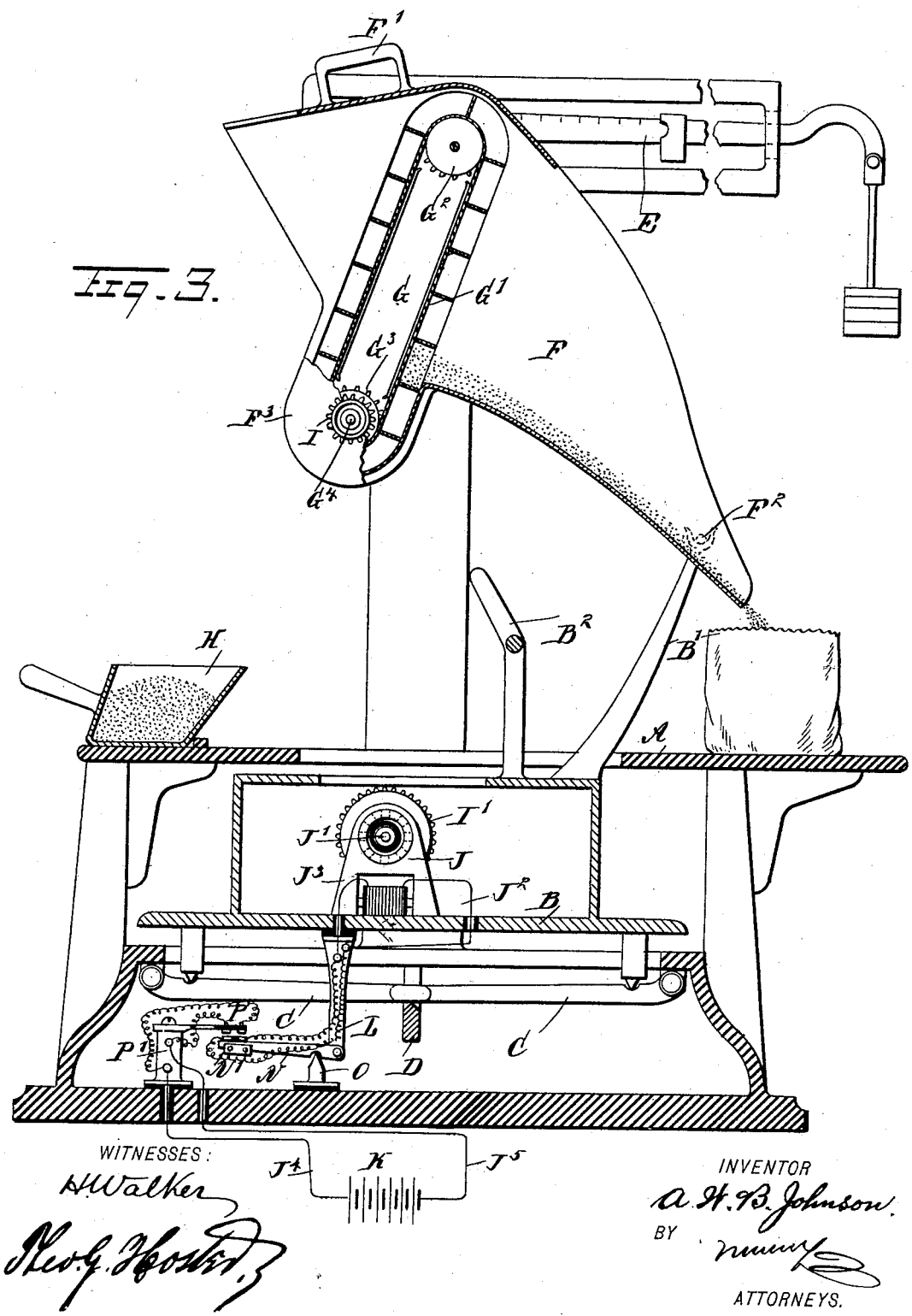

UNITED STATES PATENT OFFICE.

ALVA WRIGHT BOSWELL JOHNSON, OF MOUNT VERNON, ILLINOIS.

SELF-WEIGHING SCALE.

SPECIFICATION forming part of Letters Patent No. 624,338, dated May 2, 1899.

Application filed January 10, 1898. Serial No. 666,127. (No model.)

*To all whom it may concern:*

Be it known that I, ALVA WRIGHT BOSWELL JOHNSON, of Mount Vernon, in the county of Jefferson and State of Illinois, have invented certain new and useful Improvements in Self-Weighing Scales, of which the following is a full, clear, and exact description.

The invention relates to weighing-machines in which the load-receiver is first overloaded, and then a portion of the material is removed until a true load is obtained.

The object of the invention is to provide certain new and useful improvements in self-weighing scales whereby the surplus material is removed automatically from a scoop or other load-receiver in a very simple manner to obtain a true load, the improvement being especially serviceable for use on grocers' scales for accurately weighing sugar, coffee, tea, flour, meal, small grains of every description, powdered and granulated material, &c.

The invention consists in novel features and parts and combinations of the same, as will be fully described hereinafter and pointed out in the claims.

Reference is to be had to the accompanying drawings, forming a part of this specification, in which similar characters of reference indicate corresponding parts in all the figures.

Figure 1:
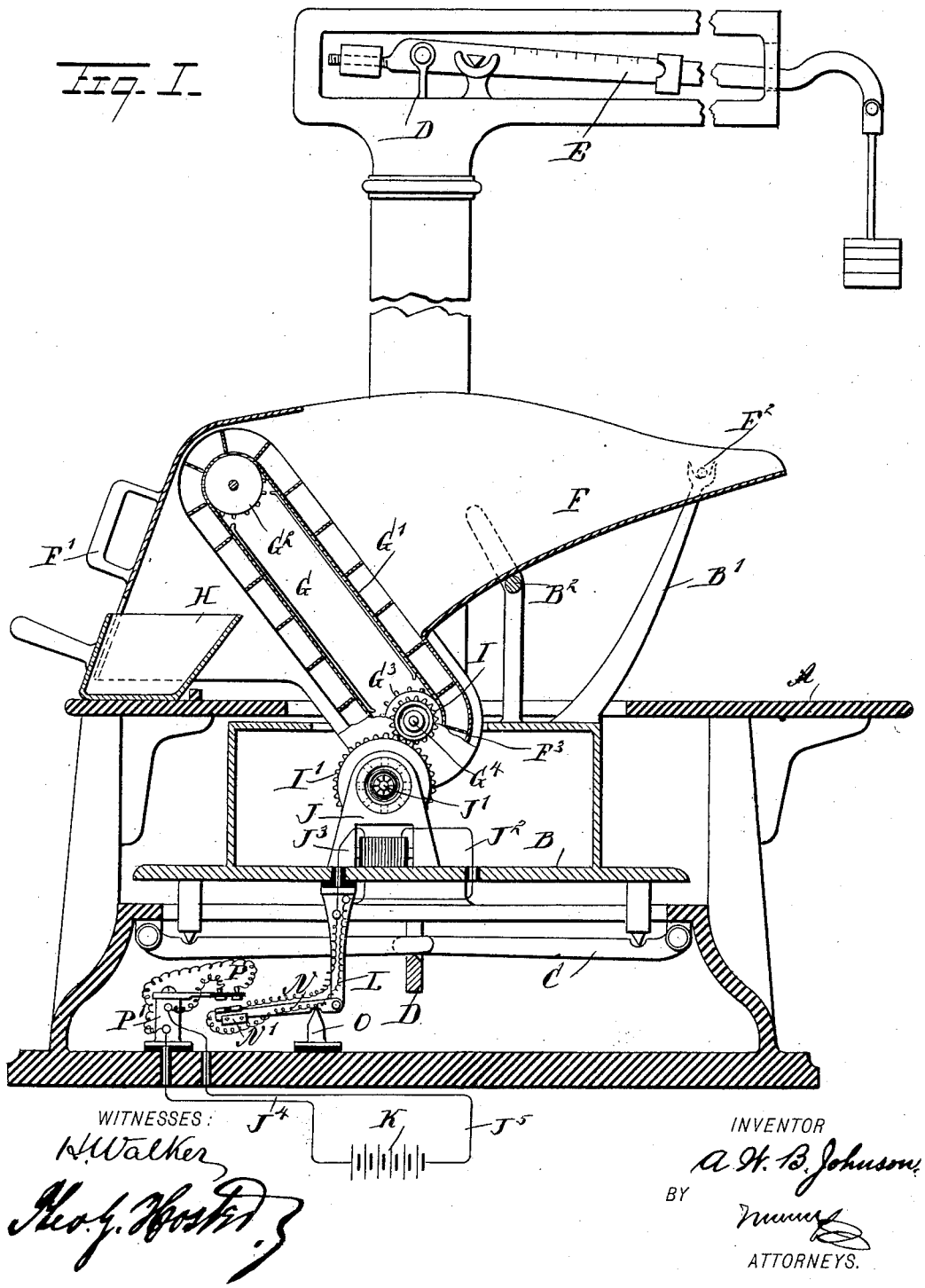
Figure 2:
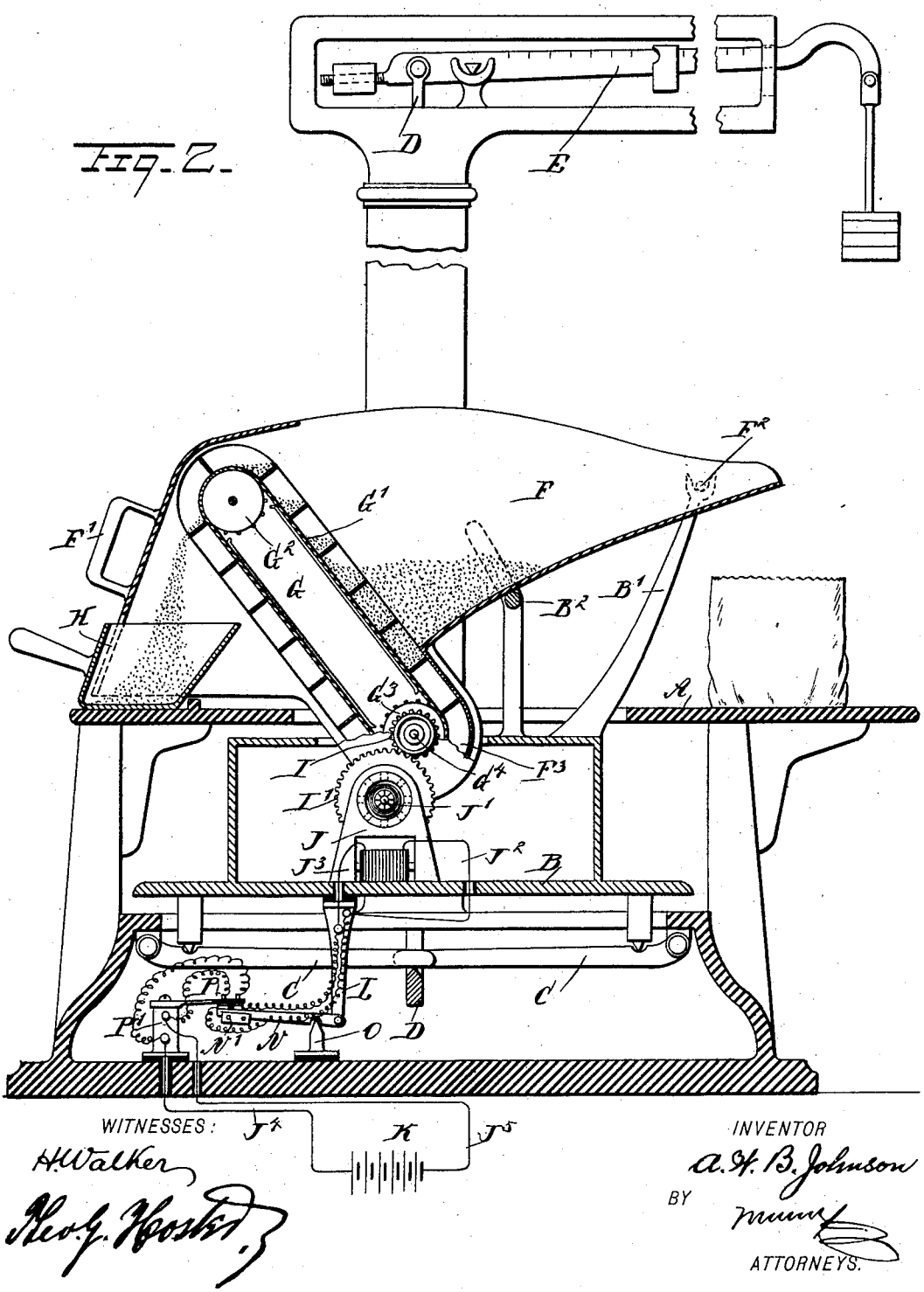

Figure 1 is a sectional side elevation of the improvement, showing the scoop empty. Fig. 2 is a similar view of the same, showing the scoop overloaded; and Fig. 3 is a like view of the same, showing the scoop discharging the correct amount.

The weighing-scale on which the improvement is applied is provided with a suitably-constructed frame A and a platform B, mounted in the usual manner on levers C, connected by a vertically-disposed link D with a scale-beam E, of any approved construction.

The load-receiver in the form of a scoop F is carried by the platform B and is provided with a handle F' at its rear end and with trunnions $F^2$ at the front or discharge spout, said trunnions being mounted in suitable bearings B', carried by the platform B, so that the operator can conveniently swing the scoop from its normal position, as shown in Figs. 1 and 2, into a raised position, as illustrated in Fig. 3, to discharge the contents of the scoop into a bag or other receptacle. The scoop F normally rests in a fork $B^2$, carried by the platform B, as will be readily understood by reference to the drawings.

The back or rear end of the scoop F is formed by the upper run of inclined buckets G', forming part of an elevator G, mounted in said scoop, for removing surplus material from the scoop and discharging the same into a receptacle H, carried on the frame A and adapted to be emptied into a bin or other receptacle from which the material was originally taken to be loaded into the scoop F. The belt or chain engaging the buckets G' of the elevator G passes over sprocket-wheels or pulleys $G^2$ $G^3$, journaled in suitable bearings in the sides of the scoop F, the lower pulley $G^3$ being provided on the outer end of its shaft $G^4$ with a pinion I, in mesh with a gear-wheel I' as long as the scoop F is in a lowermost position.

The gear-wheel I' is secured on a shaft J' of an electric motor J, of any approved construction, and carried by the platform B, the electromagnet of said motor being intermittently connected with a suitable battery K, as hereinafter more fully described. A bracket L is attached to the platform B and insulated therefrom, and the lower end of the bracket L is pivotally connected with the lever N, fulcrumed on a knife-edge O, carried by the frame A, but insulated therefrom. On the free end of the lever N are arranged contact-plates N', adapted to make contact with plates P, supported by an arm from the binding-post P', attached to but insulated from the frame A. The electromagnet of the motor is connected by wires $J^2$ $J^3$ with the contact-plates N', and similar wires $J^4$ $J^5$ connect the plates P with the poles of the battery K, so that when the contact-plates N' and P are in contact with each other then the circuit from the battery K to the motor J is closed to actuate the said motor and rotate the shaft J' and the gear-wheel I'. When this takes place, the gear-wheel I' rotates the pinion I to set the buckets G' of the elevator G in motion and cause the elevator to remove the surplus material from the scoop F and discharge it into the receptacle H.

When the scoop F is empty, as illustrated in Fig. 1, then the poise of the weighing-beam E overbalances the platform B and the parts carried thereby, so that said platform B is in an uppermost position and securely holds the lever N out of contact with the plate P, as will be readily understood by reference to said Fig. 1.

When it is desired to weigh a certain amount, the poise of the scale-beam E is set accordingly and the material to be weighed is poured into the scoop F, so as to overload and cause the beam E to swing into an uppermost position, as shown in Fig. 2, by the overweight of the platform B, so that the lever N makes contact with the plate P to close the circuit. The motor now starts the elevator G and removes the surplus material from the scoop, as previously explained, until the amount of material left in the scoop corresponds to the desired weight, when the scale-beam E will assume its horizontal position, and at this time the lever N will break its connection with the plate P to break the circuit and to stop the motor J, and consequently the elevator G. The operator now takes hold of the handle F' and swings the scoop F into an upward position to cause a discharge of the contents of the scoop into a bag or other receptacle.

As soon as the scoop is relieved of its load and the scoop is returned to its normal position then the platform B and beam E will assume their previous position, (shown in Fig. 1,) the lever N being disconnected from the contact-plate P.

Thus it will be seen that as long as the scoop is empty or not overweighted the circuit is broken and the motor J is at a standstill; but as soon as the scoop F is overloaded then contact is made between the plates N' and P, and the motor J and the elevator G are actuated for removing the surplus material and obtaining the proper amount for which the poise has been set. The scoop F is formed in its bottom with an extension-pocket $F^3$, into which fits the lower portion of the elevator G, the extension forming a trap to keep the material under treatment from leaking out of the scoop during the filling of the scoop and while the elevator is in action.

Having thus fully described my invention, I claim as new and desire to secure by Letters Patent—

1. A self-weighing scale provided with a vertically-movable and tiltable load-receiver, an elevator on said receiver, for removing the surplus material of the load, a motor for the elevator, and means carried by the scale for controlling said motor, substantially as specified.

2. A self-weighing scale provided with a load-receiver in the form of a scoop, an elevator in said scoop and having its buckets forming the back for the scoop, a motor carried by the scale for operating the elevator, and means carried by the scale for controlling the motor, substantially as shown and described.

3. A self-weighing scale provided with a vertically-movable and tiltable load-receiver, an elevator in said receiver, an electric motor for driving the said elevator, and a circuit-closer for said motor and controlled by the weight of the load, substantially as specified.

4. A self-weighing scale provided with a frame, a platform, a scale-beam for supporting said platform, a vertically-movable and tiltable scoop on said platform, an electric motor on said platform, an elevator adapted to be driven by said motor, and a circuit-closer for said motor and actuated by said platform to set the motor and elevator in motion upon overloading said scoop, substantially as specified.

5. A self-weighing scale provided with a vertically-movable and tiltable load-receiver having in its lower portion a pocket forming a trap, and an elevator on the said receiver and extending with its lower end into said pocket, substantially as specified.

6. A self-weighing scale provided with a vertically-movable and tiltable load-receiver, an elevator on said receiver for removing the surplus material of the load, a motor carried by the scale for operating the elevator, means carried by the scale for controlling the motor, and a receiving-receptacle separate from the load-receiver and adapted to receive the surplus material from the elevator, substantially as specified.

ALVA WRIGHT BOSWELL JOHNSON.

Witnesses:
A. C. JOHNSON,
J. H. RACKANAY.